(12) United States Patent
Jin et al.

(10) Patent No.: US 11,223,092 B2
(45) Date of Patent: Jan. 11, 2022

(54) BATTERY MODULE COMPRISING BUS BAR ASSEMBLY

(71) Applicant: LG Chem, Ltd., Seoul (KR)

(72) Inventors: Hee-Jun Jin, Daejeon (KR); Sung-Won Seo, Daejeon (KR); Yoon-Koo Lee, Daejeon (KR); Eun-Ah Ju, Daejeon (KR); Jeong-O Mun, Daejeon (KR)

(73) Assignee: LG Chem, Ltd.

( * ) Notice: Subject to any disclaimer, the term of this patent is extended or adjusted under 35 U.S.C. 154(b) by 206 days.

(21) Appl. No.: 16/620,266

(22) PCT Filed: Oct. 31, 2018

(86) PCT No.: PCT/KR2018/013135
§ 371 (c)(1),
(2) Date: Dec. 6, 2019

(87) PCT Pub. No.: WO2019/088714
PCT Pub. Date: May 9, 2019

(65) Prior Publication Data
US 2020/0099034 A1  Mar. 26, 2020

(30) Foreign Application Priority Data

Nov. 6, 2017  (KR) ........................ 10-2017-0146496

(51) Int. Cl.
*H01M 50/502* (2021.01)
*H01R 11/09* (2006.01)
(Continued)

(52) U.S. Cl.
CPC .......... *H01M 50/502* (2021.01); *H01R 11/09* (2013.01); *H01R 13/512* (2013.01); *H01R 25/162* (2013.01); *H01M 50/507* (2021.01)

(58) Field of Classification Search
CPC .... H01R 11/09; H01R 13/512; H01R 25/162; H01M 50/502; H01M 50/507; H02G 5/02; H02G 5/025
(Continued)

(56) References Cited

U.S. PATENT DOCUMENTS 7,497,711 B2 * 3/2009 Gherardini ........... H01R 25/162
174/72 B
9,350,127 B2 * 5/2016 Callicoat ............. H01M 50/502
(Continued)

FOREIGN PATENT DOCUMENTS

CN   101111951 A   1/2008
CN   102842695 A   12/2012
(Continued)

OTHER PUBLICATIONS

Extended European Search Report including Written Opinion for Application No. EP18873468.5, dated Oct. 23, 2020, pp. 1-7.
(Continued)

Primary Examiner — Renee S Luebke
Assistant Examiner — Paul D Baillargeon
(74) Attorney, Agent, or Firm — Lerner, David, Littenberg, Krumholz & Mentlik, LLP

(57) ABSTRACT

The battery module includes: a cell assembly; and an improved bus bar assembly to provide electric connection between a plurality of secondary batteries of the cell assembly, wherein the bus bar assembly includes: a first insulating frame having one or more insertion portions and including an electrically insulating material; a second insulating frame mounted on the front surface of the first insulating frame and including an electrically insulating material; a first bus bar mounted on the first insulating frame, contacting one of the plurality of electrode leads inserted into each of the one or more insertion portions, and including an electrically con-
(Continued)

ductive material; and a second bus bar mounted on the second insulating frame, contacting one of the plurality of electrode leads inserted into each of the one or more insertion portions, and including an electrically conductive material.

15 Claims, 15 Drawing Sheets

(51) Int. Cl.
*H01R 13/512* (2006.01)
*H01R 25/16* (2006.01)
*H01M 50/507* (2021.01)

(58) Field of Classification Search
USPC .................... 174/72 B, 68.2, 88 B, 149 B
See application file for complete search history.

(56) References Cited

U.S. PATENT DOCUMENTS

| | | | |
|---|---|---|---|
| 10,256,452 B2* | 4/2019 | Roemer | .................. H01R 9/16 |
| 2006/0214631 A1 | 9/2006 | Yoon et al. | |
| 2012/0328908 A1 | 12/2012 | Han et al. | |
| 2014/0248516 A1 | 9/2014 | Yoshioka | |
| 2014/0287622 A1 | 9/2014 | Kinoshita et al. | |
| 2015/0228942 A1 | 8/2015 | Shimoda et al. | |
| 2016/0233476 A1 | 8/2016 | Okamoto et al. | |
| 2017/0125774 A1 | 5/2017 | Choi et al. | |
| 2018/0194235 A1 | 7/2018 | Kim et al. | |
| 2020/0020915 A1* | 1/2020 | Chi | ..................... H01M 50/531 |

FOREIGN PATENT DOCUMENTS

| | | |
|---|---|---|
| CN | 103907221 A | 7/2014 |
| CN | 105531850 A | 4/2016 |
| CN | 106133948 A | 11/2016 |
| CN | 107293685 A | 10/2017 |
| EP | 2538469 A2 | 12/2012 |
| JP | 2003323879 A | 11/2003 |
| JP | 2009187972 A | 8/2009 |
| JP | 2013105698 A | 5/2013 |
| JP | 2013187046 A | 9/2013 |
| JP | 2014002905 A | 1/2014 |
| JP | 2014002925 A | 1/2014 |
| JP | 2014157742 A | 8/2014 |
| JP | 2015056342 A | 3/2015 |
| KR | 20060090469 A | 8/2006 |
| KR | 20100013759 A | 2/2010 |
| KR | 20120136542 A | 12/2012 |
| KR | 20140102423 A | 8/2014 |
| KR | 20140103642 A | 8/2014 |
| KR | 20170103232 A | 9/2017 |

OTHER PUBLICATIONS

International Search Report for PCT/KR2018/013135 dated Feb. 19, 2019.

* cited by examiner

US 11,223,092 B2

BATTERY MODULE COMPRISING BUS BAR ASSEMBLY

CROSS-REFERENCE TO RELATED APPLICATIONS

The present application is a national phase entry under 35 U.S.C. § 371 of International Application No. PCT/KR2018/013135, filed Oct. 31, 2018, which claims priority to Korean Patent Application No. 10-2017-0146496 filed on Nov. 6, 2017 in the Republic of Korea, the disclosures of which are incorporated herein by reference.

TECHNICAL FIELD

The present disclosure relates to a battery module including a bus bar assembly, and more particularly, to a battery module including a bus bar assembly having improved productivity because rework is easy when a failure occurs.

BACKGROUND ART

Currently commercialized secondary batteries include nickel cadmium batteries, nickel hydrogen batteries, nickel zinc batteries, lithium secondary batteries, etc. and the lithium secondary batteries thereamong are receiving attention according advantages of free charging/discharging, a very low self-discharge rate, and high energy density since a memory effect is barely generated compared to nickel-based secondary batteries.

Such a lithium secondary battery mainly uses a lithium-based oxide and a carbon material respectively as a positive electrode active material and a negative electrode active material. The lithium secondary battery includes an electrode assembly, in which a positive electrode plate and a negative electrode plate on which the positive electrode active material and the negative electrode active material are respectively coated are arranged with a separator therebetween, and an exterior material, i.e., a battery pouch exterior material, sealing and accommodating the electrode assembly with an electrolyte solution.

Generally, the lithium secondary battery may be classified into a can-type secondary battery, in which the electrode assembly is embedded in a metal can, and a pouch-type secondary battery, in which the electrode assembly is embedded in a pouch of an aluminum laminate sheet, according to a shape of the exterior material.

Recently, the secondary battery is widely used not only in a small-sized apparatus, such as a portable electronic device, but also in medium- and large-sized apparatuses, such as a vehicle or an energy storage apparatus. When the secondary battery is used in the medium- and large-sized apparatuses, a large number of secondary batteries are electrically connected to increase capacity and output. In particular, the pouch-type secondary battery is mostly used in such medium- and large-sized apparatuses due to easy stacking.

In order for the secondary batteries to be electrically connected inside a battery module, electrode leads may be connected to each other and a connected portion may be welded to maintain such a connected state. Moreover, the battery module may have parallel and/or series electric connection between the secondary batteries, and in this case, one end portion of the electrode lead may contact and be fixed to a bus bar for electric connection between the secondary batteries, via welding or the like.

At this time, the electric connection between the secondary batteries is often configured by bonding the electrode lead to the bus bar. In other words, in order to electrically connect the plurality of secondary batteries in parallel, the electrode leads of same polarity are connected and bonded to each other, and in order to electrically connect the plurality of secondary batteries in series, the electrode leads of different polarities are connected and bonded to each other.

Meanwhile, since the electrode lead is formed of a fragile material, while detaching or re-bonding the combined electrode lead for rework due to poor bonding or mis-bonding between the electrode lead and the bus bar, it is difficult for an operator to perform the rework because the electrode lead is very easily damaged.

Also, when a bending process of bending the electrode lead to accommodate the electrode lead on the bus bar is performed, the bent electrode lead causes a spring-back phenomenon, and thus it is difficult to adhere the electrode lead and the bus bar to each other.

Further, in the related art, the bending process of the electrode lead is performed manually to bond the electrode lead on the bus bar. However, since such a bending process is difficult to be automated and the quality of weldability varies based on the skill or condition of the operator, the quality of a product may deteriorate.

Also, since laser welding is performed while the plurality of electrode leads overlap each other during a parallel connection process of the plurality of secondary batteries, deterioration of weldability is likely to occur.

Accordingly, in order to solve issues of the related art described above, there is a need for a technology satisfactorily maintaining contact between the electrode lead and the bus bar and enabling the rework during the poor bonding or mis-bonding between the bus bar and the electrode lead.

DISCLOSURE

Technical Problem

The present disclosure is designed to solve the problems of the related art, and therefore the present disclosure is directed to providing a battery module including a bus bar assembly having improved productivity because rework is easy when a failure occurs.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module including: a cell assembly including a plurality of secondary batteries having a plurality of electrode leads, respectively, formed in a shape protruding in a front-and-back direction and stacked on each other in a left-and-right direction; and a bus bar assembly configured to provide electric connection between the plurality of secondary batteries.

Here, the bus bar assembly includes: a first insulating frame where one or more insertion portions penetrating from a back surface to a front surface are formed such that at least one of the plurality of electrode leads is inserted in each of the one or more insertion portions, and comprising an electrically insulating material; a second insulating frame mounted on the front surface of the first insulating frame and including an electrically insulating material; a first bus bar mounted on the first insulating frame, contacting one of the plurality of electrode leads inserted into each of the one or more insertion portions, the one of the plurality of electrode leads being located at a first end of the plurality of electrode leads, and including an electrically conductive material; and a second bus bar mounted on the second insulating frame, contacting one of the plurality of electrode leads inserted into each of the one or more insertion portions located at a second end opposite the first end, and including an electrically conductive material.

Also, the first bus bar and the second bus bar may respectively include front surfaces, rear surfaces, and side surfaces based on the front-and-back direction.

Moreover, the side surfaces of each of the first bus bar and the second bus bar may contact a left side surface or right side surface of one of the plurality of electrode leads, and at least portions of the side surfaces of the first bus bar and the second bus bar may be positioned to face each other while the plurality of electrode leads are disposed to closely contact each other.

In addition, the first bus bar and the second bus bar may each have a bar shape extending in an up-and-down direction or a quadrangular frame shape with a hollow center.

Further, the second insulating frame may include a penetrating portion penetrated from a rear surface to a front surface such that at least one of the plurality of electrode leads is inserted in the penetration portion.

Also, the first bus bar may be positioned on the front surface of the first insulating frame and have at least a portion protruding forward and inserted into the penetrating portion.

In addition, the first bus bar may be configured to protrude forward past a front surface of the second insulating frame.

Also, the second bus bar may be positioned on the front surface of the second insulating frame.

Further, the second bus bar may be positioned at an inner side of the penetrating portion such that one of the side surfaces faces a portion of one of the side surfaces of the first bus bar.

Also, the first bus bar may be configured to be positioned at an inner side of an insertion portion formed in the first insulating frame.

In addition, at least a portion of the second bus bar may protrude backward from a rear surface of the second insulating frame and be inserted into the insertion portion of the first insulating frame.

Also, the bus bar assembly may further include a locking member configured to lock and fix the first insulating frame and the second insulating frame to each other.

Further, the locking member may include a locking bolt.

Also, the first insulating frame may include an insertion groove configured such that at least a portion of a round rod of the locking bolt is inserted.

In addition, the second insulating frame may include a penetrating hole configured such that the round rod of the locking bolt is penetrated.

Also, the locking bolt sequentially may penetrate the penetrating hole of the second insulating frame and be inserted into and fixed to the insertion groove of the first insulating frame.

Moreover, the locking member may further include a nut or a bearing inserted into and fixed to the insertion groove and configured to lock the locking bolt inserted therein.

Also, each of the first insulating frame and the second insulating frame may include a moving guide portion configured to guide the first insulating frame and the second insulating frame to slide in the left-and-right direction to cross each other.

Also, the moving guide portion may include: a guide groove recessed backward from each of a top portion and a bottom portion of the front surface of the first insulating frame and extending in the left-and-right direction; and a guide protrusion protruding backward from each of a top portion and a bottom portion of a rear surface of the second insulating frame and accommodated on an inner surface of the guide groove to move in the left-and-right direction.

In another aspect of the present disclosure, there is also provided a battery module including: a cell assembly including a plurality of secondary batteries having a plurality of electrode leads, respectively, formed in a shape protruding in a front-and-back direction and stacked on each other in a left-and-right direction; and a bus bar assembly configured to provide electric connection between the plurality of secondary batteries, wherein the bus bar assembly may include: a first insulating frame where one or more insertion portions perforated from a back surface to a front surface are formed such that at least one of the plurality of electrode leads is inserted in each of the one or more insertion portions while being adhered to each other, and including an electrically insulating material; a second insulating frame mounted on the front surface of the first insulating frame, where one or more penetrating portions perforated from a rear surface to a front surface are formed such that at least one of the plurality of electrode leads is inserted in each of the one or more insertion portions while being adhered to each other, and including an electrically insulating material; a first bus bar mounted on the first insulating frame, contacting one of the plurality of electrode leads inserted into each of the one or more insertion portions, the one of the plurality of electrode leads being located at a first end of the plurality of electrode leads, and including an electrically conductive material; and a second bus bar mounted on the second insulating frame, contacting one of the plurality of electrode leads inserted into each of the one or more insertion portions located at a second end opposite the first end, and including an electrically conductive material, wherein the plurality of electrode leads overlap each other between the first insulating frame and the second insulating frame while the first insulating frame and the second insulating frame slide in the left-and-right direction to cross each other.

In another aspect of the present disclosure, there is also provided a battery pack including at least one battery module.

In another aspect of the present disclosure, there is also provided a device including the battery pack.

Advantageous Effects

According to an aspect of the present disclosure, a battery module is configured such that a first bus bar and a second bus bar of a bus bar assembly contact both side surfaces of a plurality of electrode leads inserted into an insertion portion of a first insulating frame, and thus electric connection between a plurality of secondary batteries and bus bars can be effectively achieved as the first bus bar and the second bus bar contact the both side surfaces such that the plurality of electrode leads are suitably adhered.

Moreover, according to such an aspect of the present disclosure, unlike the related art, the present disclosure can simplify manufacturing processes and reduce manufacturing costs because a bending process and a bonding process via welding or the like are not required to be performed for contact connection between an electrode lead and bus bar. In addition, since a bus bar assembly can be separated from a battery module without largely damaging the electrode lead when a defect occurs, rework is facilitated and waste of a component due to damage can be reduced.

Also, according to an aspect of the present disclosure, in a bus bar assembly, the size of a bus bar assembly can be ultimately reduced since not only a second bus bar is stably fixed to a second insulating frame without having to use a separate adhesive member by inserting a portion of the second bus bar into the second insulating frame, but also the volume occupied by the second bus bar in a front-and-back direction is largely reduced compared with the size of the second insulating frame and second bus bar in the front-and-back direction.

Moreover, according to another aspect of the present disclosure, in a bus bar assembly, since a portion of a second bus bar is positioned at an inner side of a penetrating portion formed in a second insulating frame, the size of a protruding structure of a first bus bur positioned to correspond to one side surface of the second bus bar can be largely reduced, and thus manufacturing costs can be reduced and the bus bar assembly may be manufactured to have a further stable structure.

Also, according to another aspect of the present disclosure, in a bus bar assembly, by positioning a first bus bar at an inner side of an insertion portion formed in a first insulating frame, the volume occupied by the first bus bar in a front-and-back direction can be largely reduced compared to the size of the first insulating frame and first bus bar in the front-and-back direction, thereby ultimately reducing the size of the bus bar assembly.

Moreover, according to an aspect of the present disclosure, in a locking member, by inserting and fixing a locking bolt to an insertion hole formed in a first insulating frame and a penetrating hole formed in a second insulating frame, the first insulating frame and the second insulating frame can be efficiently and stably combined and fixed to each other.

Also, according to an aspect of the present disclosure, in a guide portion, since a second insulating frame can easily slide on a first insulating frame by using a configuration of a guide groove and a guide protrusion, not only position setting for locking the first insulating frame and the second insulating frame is facilitated, but also a work of interposing a plurality of electrode leads between a first bus bar and a second bus bar is facilitated.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
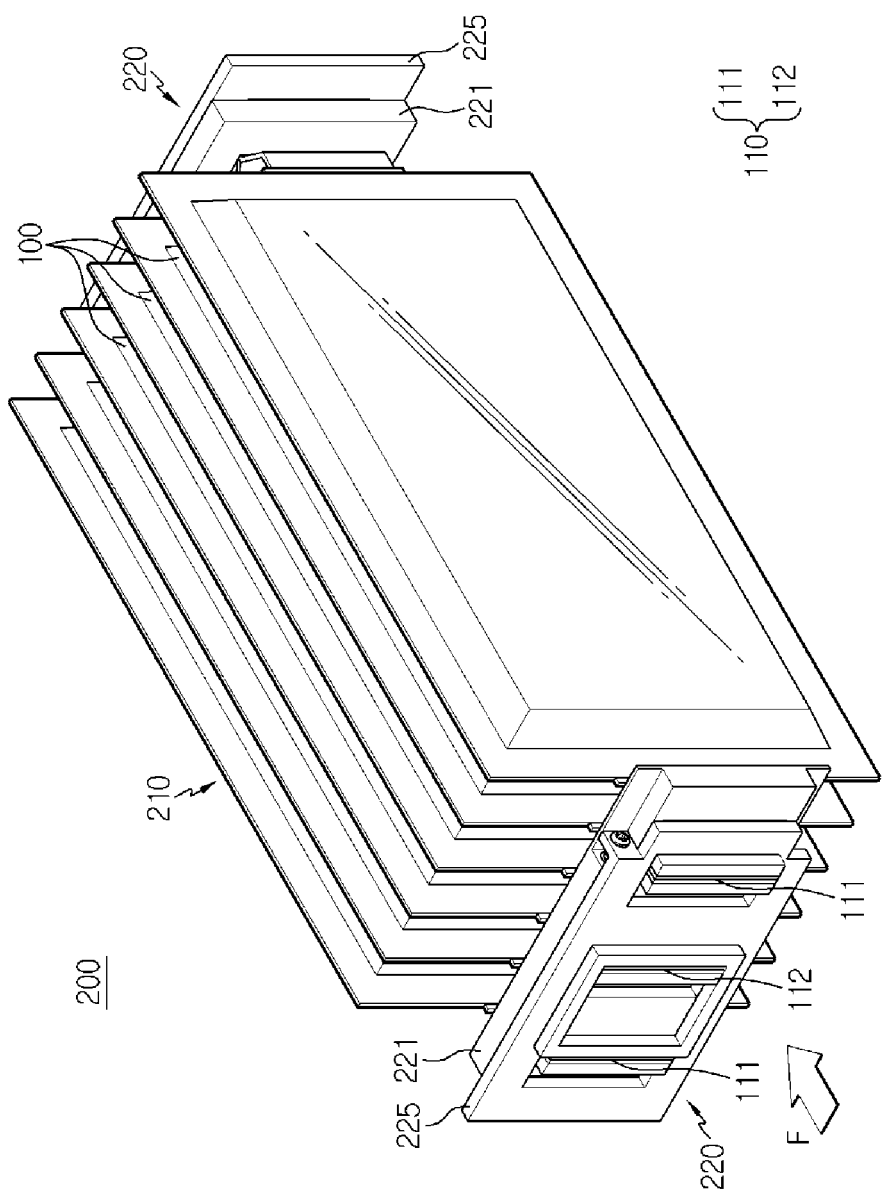
FIG. 1 is a perspective view schematically illustrating a battery module according to an embodiment of the present disclosure.

FIG. 1 is a perspective view schematically illustrating a battery module according to an embodiment of the present disclosure. Also, FIG. 2 is a plan view schematically illustrating a battery module according to an embodiment of the present disclosure.

Figure 2:
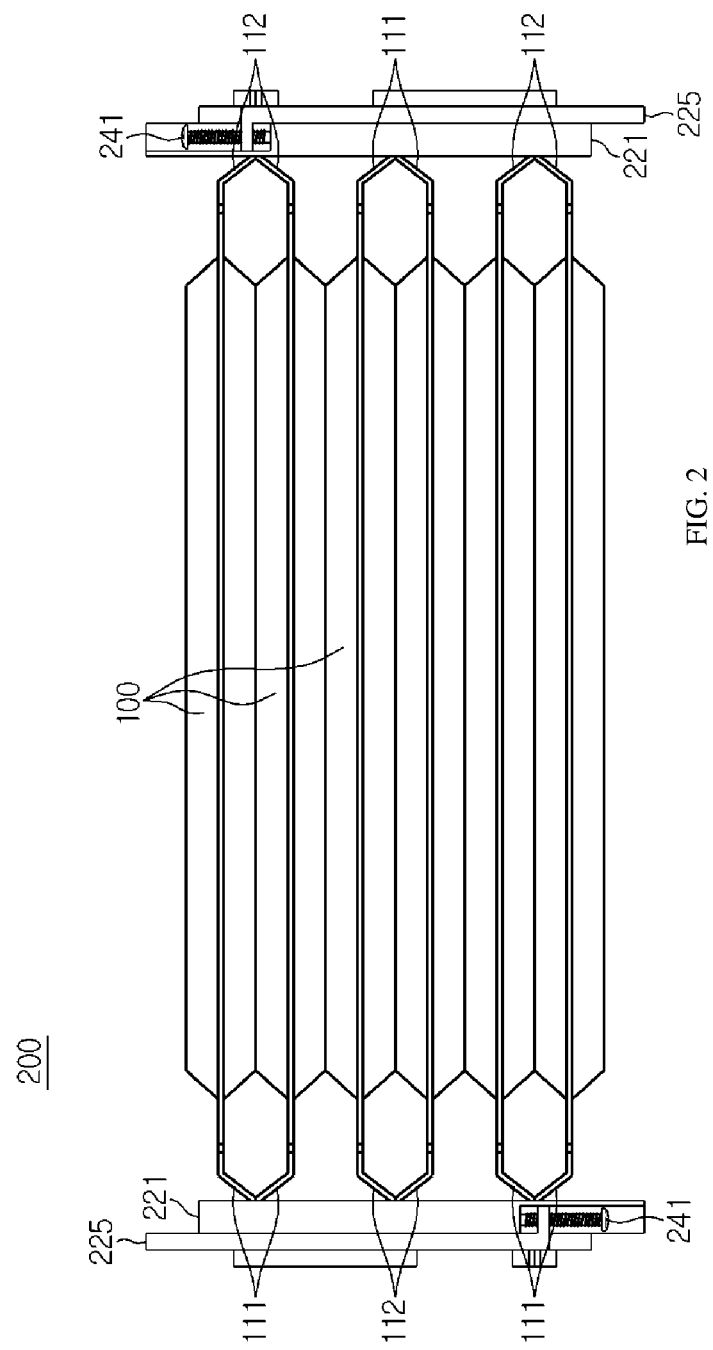
FIG. 2 is a plan view schematically illustrating a battery module according to an embodiment of the present disclosure.

Referring to FIGS. 1 and 2, a battery module 200 according to an embodiment of the present disclosure may include a cell assembly 210 including a plurality of secondary batteries 100, and a bus bar assembly 220.

Here, the secondary battery 100 may be a pouch type secondary battery 100. In particular, the pouch type secondary battery 100 may include an electrode assembly, an electrolyte solution, and a pouch.

Here, the pouch may be configured of two pouches, i.e., a left pouch and a right pouch, which have an accommodating portion of a concave shape. Also, each pouch includes an external insulating layer, a metal layer, and an internal adhesive layer, and the inner adhesive layers may be adhered to each other at edge regions of the pouches to form a sealing portion. Also, the electrode assembly and the electrolyte solution may be accommodated in the accommodating portion.

Also, the electrode assembly is an assembly of electrodes and a separator, and may be configured in a shape in which one or more positive electrode plates and one or more negative electrode plates are arranged with the separator therebetween. Also, a first electrode tab is provided at a first electrode plate of the electrode assembly and one or more first electrode tabs may be connected to a first electrode lead 111.

Here, the first electrode lead 111 has one end connected to the first electrode tab and the other end exposed to the outside of the pouch, and such an exposed portion may function as an electrode terminal of the secondary battery 100, for example, a positive electrode terminal of the secondary battery 100.

Also, a second electrode tab is provided at a second electrode plate of the electrode assembly and one or more second electrode tabs may be connected to a second electrode lead 112. The second electrode lead 112 has one end connected to the second electrode tab and the other end exposed to the outside of the pouch, and such an exposed portion may function as an electrode terminal of the secondary battery 100, for example, a negative electrode terminal of the secondary battery 100.

Here, the first electrode tab and the second electrode tab included in the secondary battery 100 may be a positive electrode tab or a negative electrode tab, and the first electrode lead 111 and the second electrode lead 112 may be a positive electrode lead or a negative electrode lead. Moreover, the first and second electrode leads 111 and 112 may be electrode leads of different polarities. For example, the first electrode lead 111 may be a positive electrode lead and the second electrode lead 112 may be a negative electrode lead.

Further, the positive electrode lead and the negative electrode lead may be provided on opposite directions based on the center of the secondary battery 100. For example, as shown in FIGS. 1 and 2, each secondary battery 100 may be configured such that the first and second electrode leads 111 and 112 having different polarities protrude forward and backward.

As such, according to such a configuration of the present disclosure, there is no interference between the positive electrode lead and the negative electrode lead in one secondary battery 100, and thus the area of an electrode lead 110 may be increased. Here, the electrode lead 110 includes the first electrode lead 111 and the second electrode lead 112.

Also, the first and second electrode leads 111 and 112 may be configured in a plate shape. In particular, the first and second electrode leads 111 and 112 may protrude in a horizontal direction while a wide area is erected to face the left and the right.

Also, the plurality of secondary batteries 100 may be included in the battery module 200 and stacked on each other in at least one direction. For example, as shown in FIGS. 1 and 2, the plurality of pouch type secondary batteries 100 may be stacked on each other in parallel in a left-and-right direction.

Here, each pouch type secondary battery 100 may be arranged to be perpendicularly erected approximately on the ground such that, when viewed in a direction indicated by an arrow F (shown in FIG. 1), two wide areas are respectively positioned at the left and the right and a sealing portion is positioned at top, bottom, front, and back. In other words, each secondary battery 100 may be erected in an up-and-down direction. Meanwhile, in the present specification, unless otherwise specified, up, down, front, back, left, and right directions are based on the direction indicated by the arrow F.

Since the configuration of the pouch type secondary battery 100 described above is obvious to one of ordinary skill in the art of the present disclosure, more detailed descriptions are omitted. Also, the battery module 200 according to the present disclosure may employ various secondary batteries 100 well-known at the time of application of the present disclosure.

Figure 3:
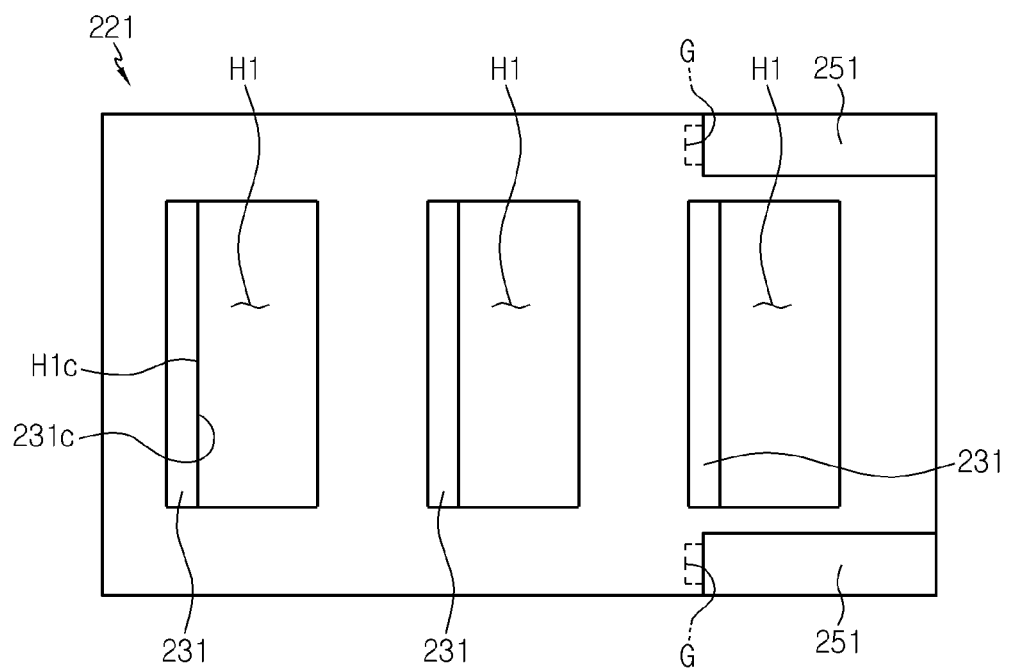
FIG. 3 is a front view schematically illustrating a first bus bar and a first insulating frame, which are isolated partial components with respect to a battery module, according to an embodiment of the present disclosure.
Figure 4:
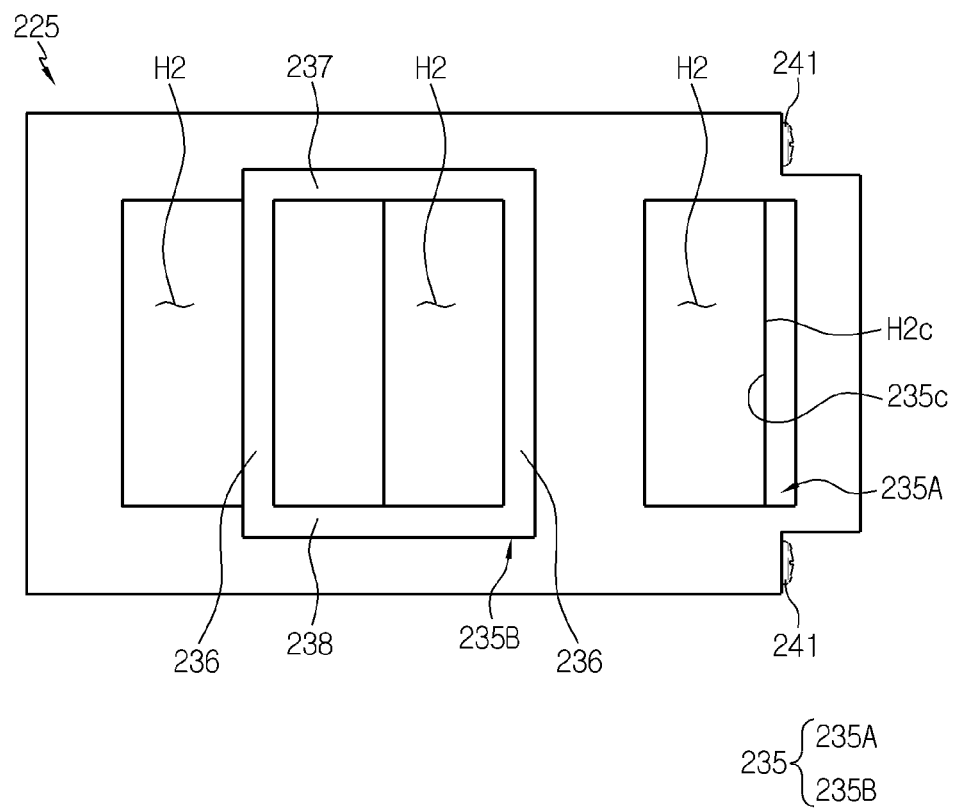
FIG. 4 is a front view schematically illustrating a second bus bar and a second insulating frame, which are isolated partial components with respect to a battery module, according to an embodiment of the present disclosure.
Figure 5:
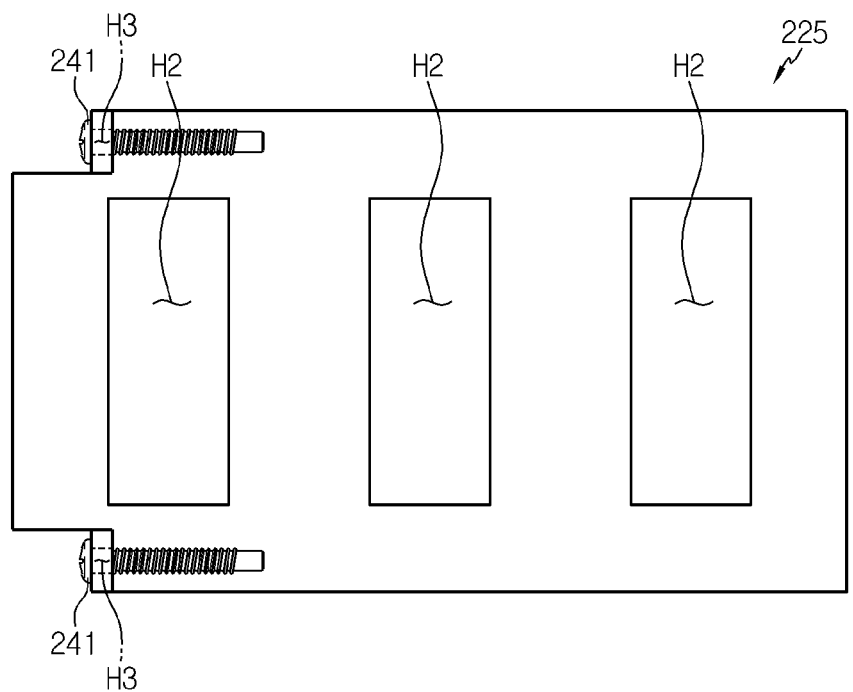
FIG. 5 is a rear view schematically illustrating a second insulating frame that is an isolated partial component with respect to a battery module, according to an embodiment of the present disclosure.
Figure 6:
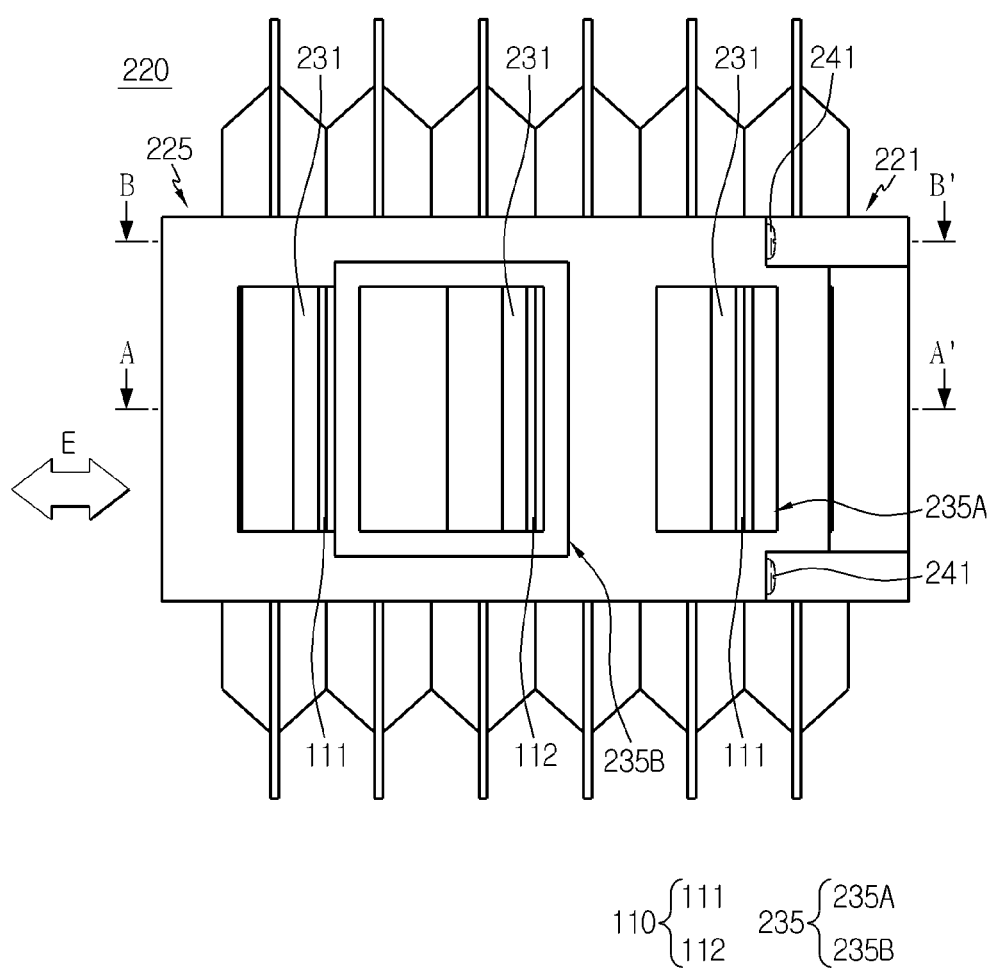
FIG. 6 is a front view schematically illustrating a battery module according to an embodiment of the present disclosure.

FIG. 3 is a front view schematically illustrating a first bus bar and a first insulating frame, which are isolated partial components with respect to a battery module, according to an embodiment of the present disclosure. FIG. 4 is a front view schematically illustrating a second bus bar and a second insulating frame, which are isolated partial components with respect to a battery module, according to an embodiment of the present disclosure. FIG. 5 is a rear view schematically illustrating a second insulating frame that is an isolated partial component with respect to a battery module, according to an embodiment of the present disclosure. FIG. 6 is a front view schematically illustrating a battery module according to an embodiment of the present disclosure.

Referring to FIGS. 3 through 6, the bus bar assembly 220 may be configured to provide electric connection between the plurality of secondary batteries 100. In particular, the bus bar assembly 220 may be positioned at each of the front and back of the cell assembly 210 including the plurality of secondary batteries 100 where the electrode lead 110 is formed on both sides.

Here, the bus bar assembly 220 may include a first insulating frame 221, a second insulating frame 225, a first bus bar 231, and a second bus bar 235.

In particular, the first insulating frame 221 may include an electrically insulating material. Also, the electrically insulating material may be, for example, a plastic material. Also, the first insulating frame 221 may include one or more insertion portion H1 penetrating from a rear surface to a front surface such that the plurality of electrode leads 110 are inserted.

Moreover, the insertion portion H1 may have an opening having the size into which the plurality of electrode leads 110 is insertable. For example, as shown in FIG. 3, three insertion portions H1 may be formed in the first insulating frame 221, and each insertion portion H1 may have the opening having the size corresponding to a vertical length of the electrode lead 110.

Also, the insertion portion H1 may be an opening perforated at an inner side of the first insulating frame 221. The plurality of electrode leads 110 may be easily inserted into the insertion portion H1 having such an opening, in the front-and-back direction.

Alternatively, the insertion portion H1 may be an opening extending from the center of the first insulating frame 221 to an upper end portion or a lower end portion. In the insertion portion H1 having such a structure, since the plurality of electrode leads 110 are not only inserted into the first insulating frame 221 in the front-and-back direction, but also into the center from the upper end portion or the lower end portion of the first insulating frame 221, insertion is facilitated in various directions and thus manufacture efficiency may be increased.

The second insulating frame 225 may include an electrically insulating material. The electrically insulating material may be, for example, a plastic material. Also, the second insulating frame 225 may be mounted on a front surface of the first insulating frame 221. The second insulating frame 225 may be configured to slide in a left-and-right direction while being mounted on the front surface of the first insulating frame 221.

Moreover, the first bus bar 231 may include an electrically conductive material having relatively high electric conductivity. For example, the electrically conductive material may be copper or aluminum.

Also, the first bus bar 231 may be mounted on the first insulating frame 221. In other words, the first bus bar 231 may be fixed while being mounted on the first insulating frame 221. Moreover, a method of fixing the first bus bar 231 to the first insulating frame 221 is not limited to a specific method, and for example, an adhesive may be coated on an outer surface of the first insulating frame 221 and then the first bus bar 231 may be adhered to a region where the adhesive is coated.

Also, the first bus bar 231 may be configured such as to contact one of the plurality of electrode leads 110 inserted into the insertion portion H1 of the first insulating frame 221. In particular, the first bus bar 231 may contact one side surface of the electrode lead 110 positioned at one end (a leftmost or rightmost side) among the plurality of electrode leads 110 adhered in the left-and-right direction.

Also, the second bus bar 235 may be mounted on the second insulating frame 225. In other words, the second bus bar 235 may be fixed while being mounted on the second insulating frame 225. A method of fixing the second bus bar 235 to the second insulating frame 225 is not limited to a particular method, and for example, an adhesive may be coated on an outer surface of the second insulating frame 225 and then the second bus bar 235 may be adhered to a region where the adhesive is coated.

Moreover, the second bus bar 235 may be configured to contact one of the plurality of electrode leads 110 inserted into the insertion portion H1 of the first insulating frame 221. In particular, the second bus bar 235 may contact the other side surface of the electrode lead 110 positioned at the other end (the leftmost or rightmost side) among the plurality of electrode leads 110 adhered in the left-and-right direction.

For example, as shown in FIG. 6, when the first bus bar 231 contacts the electrode lead 110 positioned at the leftmost side among the plurality of electrode leads 10 inserted into the insertion portion H1, the second bus bar 235 may contact the electrode lead 110 positioned at the rightmost side and inserted into the insertion portion H1.

Thus, according to such a configuration of the present disclosure, by configuring the first and second bus bars 231 and 235 to contact the both side surfaces of the plurality of electrode leads 110 inserted into the insertion portion H1, the first and second bus bars 231 and 235 are able to pressurize, from the both side surfaces, the plurality of electrode leads 110 to be suitably adhered, thereby effectively achieving electric connection between a plurality of secondary batteries and a bus bar.

Moreover, in the present disclosure, unlike the related art, manufacturing processes are simplified and manufacturing costs are reduced because a bending process and a bonding process via welding or the like are not required to be performed for contact connection between an electrode lead and bus bar. In addition, since a bus bar assembly may be separated from a battery module without largely damaging the electrode lead when a defect occurs, rework is facilitated and waste of a component due to damage may be reduced.

Figure 7:
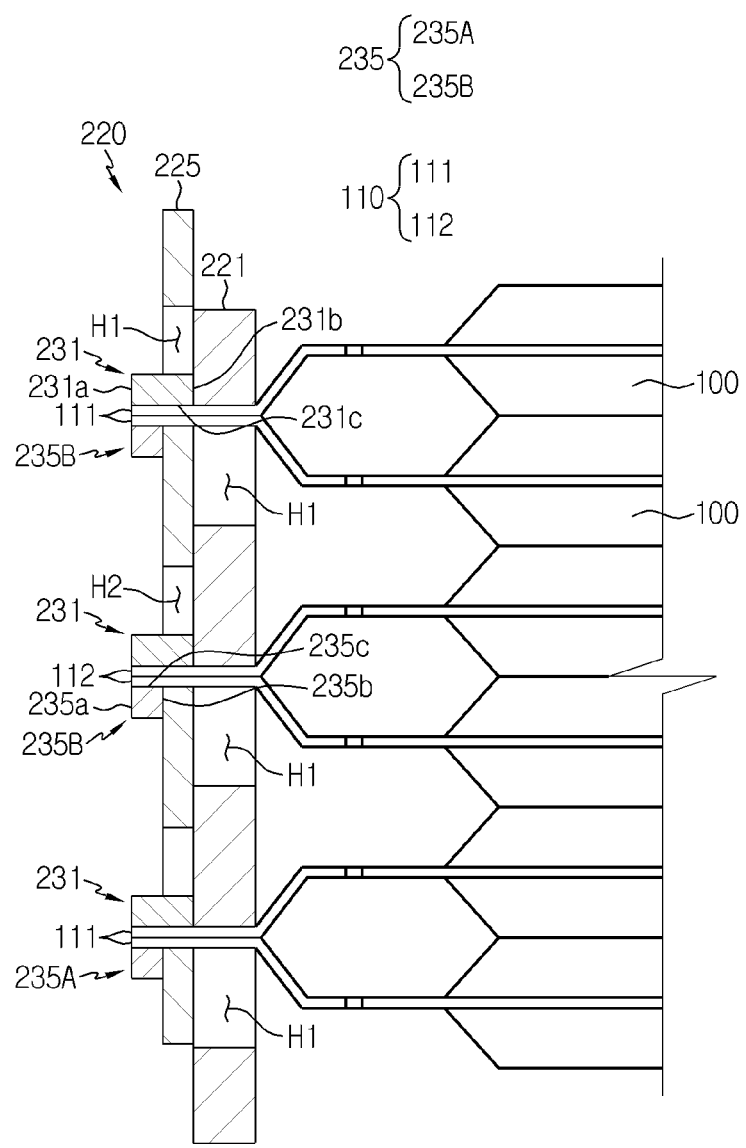
FIG. 7 is a partial cross-sectional view schematically illustrating a cross section of a battery module taken along a line A-A' of FIG. 6.

FIG. 7 is a partial cross-sectional view schematically illustrating a cross section of a battery module taken along a line A-A' of FIG. 6.

Referring to FIG. 7 together with FIG. 6, the first bus bar 231 may include, based on the front-and-back direction, a front surface 231*a*, a rear surface 231*b*, and a side surface 231*c*.

Here, the side surface 231*c* of the first bus bar 231 may contact a left side surface or right side surface of the electrode lead 110. For example, as shown in FIG. 7, the right side surface 231*c* of the first bus bar 231 may contact a left side surface of the first electrode lead 111.

Similarly, the second bus bar 235 may include, based on the front-and-back direction, a front surface 235*a*, a rear surface 235*b*, and a side surface 235*c*.

Here, the side surface 235*c* of the second bus bar 235 may contact the left side surface or right side surface of the electrode lead 110. For example, as shown in FIG. 7, the left side surface 235*c* of the second bus bar 235 may contact a right side surface of the second electrode lead 112.

Also, the first bus bar 231 and the second bus bar 235 may be positioned so that at least the side surfaces thereof at least partially face each other in a state where the plurality of electrode leads 110 are interposed between the first bus bar 231 and the second bus bar 235 and adhered to each other. In other words, the side surface of the first bus bar 231 may contact one side surface of the electrode lead 110 positioned at the end of the plurality of electrode leads 110 adhered to each other, and the side surface of the second bus bar 235 may contact the other side surface of the electrode lead 110 positioned at the other end of the plurality of electrode leads 110 adhered to each other.

As such, according to such a configuration of the present disclosure, since the first and second bus bars 231 and 235 are formed in a structure capable of effectively contacting the one side surface and the other side surface of the plurality of electrode leads 110 adhered to each other, an adhered state between the plurality of electrode leads 110 may be maintained and electric connection between the plurality of secondary batteries 100 may be effectively achieved.

Referring back to FIG. 3, the first bus bar 231 may have a bar shape extending in the up-and-down direction. In particular, the first bus bar 231 may be formed in such a manner that the side surface 231*c* has the size equal to or larger than that of a side H1*c* of the insertion portion H1. Also, the first bus bar 231 may be positioned such that the side surface 231c is parallel to the other side H1c of the insertion portion H1 of the insertion portion H1 when viewed from the front. In other words, the first bus bar 231 may be positioned such that, when viewed from the front, the side surface 231c and the other side H1c of the insertion portion H1 contact each other.

For example, as shown in FIG. 3, the three first bus bars 231 may have a bar shape extending in the up-and-down direction. Also, the three first bus bars 231 may be positioned such that, when viewed from the front, the right side surface 231c overlap the left side H1c of the insertion portion H1.

However, the shape of the first bus bar 231 is not necessarily limited to a bar shape, and the first bus bar 231 may have a quadrangular frame shape with a hollow center, like a second bus bar 235B of FIG. 4. In other words, the first bus bar 231 includes an upper end portion and a lower end portion extending in the left-and-right direction, and may include a both side portions extending in the up-and-down direction to connect the upper end portion and the lower end portion.

As such, according to such a configuration of the present disclosure, since the first bus bar 231 is formed such that the side surface of the electrode lead 110 inserted through the insertion portion H1 of the first insulating frame 221 is easily contacted, electric connection between the electrode lead 110 and the first bus bar 231 may be easily achieved.

In particular, a second bus bar 235A may have a bar shape extending in the up-and-down direction. In particular, the second bus bar 235A may be formed such that the side surface 235c thereof may have the size equal to or larger than that of a side H2c of a penetrating portion H2. Also, the other side surface 235c of the second bus bar 235A may be positioned to be parallel to the side H2c of the penetrating portion H2 when viewed from the front. In other words, the other side surface 235c of the second bus bar 235A and the side H2c of the penetrating portion H2 may be positioned to contact each other.

Moreover, the second bus bar 235B according to another embodiment may have a quadrangular frame shape with a hollow center. In other words, the second bus bar 235B includes an upper end portion 237 and a lower end portion 238 extending in the left-and-right direction, and may include a both side portions 236 extending in the up-and-down direction to connect the upper end portion 237 and the lower end portion 238.

For example, as shown in FIG. 4, one second bus bar 235A may have a bar shape extending in the up-and-down direction and one second bus bar 235B may have a quadrangular shape with a hollow center. Also, the two second bus bars 235A and 235B may be positioned such that left side portions thereof overlap the right side H2c of the penetrating portion H2 when viewed from the front.

Accordingly, the second bus bar 235B is formed to easily contact the side surface of the plurality of electrode leads 110 inserted through the penetrating portion H2 of the second insulating frame 225, and thus electric connection between the plurality of electrode leads 110 and the second bus bar 235B may be easily achieved.

Also, in the second insulating frame 225, one or more penetrating portion H2 penetrated from the rear surface to the front surface may be formed such that the plurality of electrode leads 110 are inserted.

Moreover, the penetrating portion H2 may have an opening having the size into which the plurality of electrode leads 110 is insertable. For example, as shown in FIG. 4, the second insulating frame 225 may include three penetrating portions H2 and each penetrating portion H2 may have an opening having the size corresponding to a vertical length of the electrode lead 110.

Also, the penetrating portion H2 may be an opening extending from the center of the second insulating frame 225 to the upper end portion or the lower end portion. In such a penetrating portion H2, the plurality of electrode leads 110 are insertable not only to the second insulating frame 225 in the front-and-back direction, but also to the center from the upper end portion or lower end portion of the second insulating frame 225, and thus manufacture efficiency may be increased.

Referring back to FIG. 7 together with FIG. 6, at least one portion of the penetrating portion H2 may be positioned to face the insertion portion H1 of the first insulating frame 221. In other words, the electrode lead 110 may be configured to penetrate the insertion portion H1 and then penetrate the penetrating portion H2 again.

Referring to FIGS. 3 and 7, the first bus bar 231 may be positioned at the front surface of the first insulating frame 221. In particular, the first bus bar 231 may be positioned such that the side surface 231c of the first bus bar 231 and an inner side surface of the first insulating frame 221 are connected in the front-and-back direction.

Also, the first bus bar 231 may be formed such that at least a portion protrudes forward to be inserted into the penetrating portion H2. Moreover, the first bus bar 231 may protrude to face at least a portion of the second bus bar 235. For example, as shown in FIG. 7, the first bus bar 231 may protrude to face one side surface of the second bus bar 235.

Moreover, the first bus bar 231 may be configured to further protrude forward based on the front surface of the second insulating frame 225. In other words, the first bus bar 231 may protrude externally by penetrating the insertion portion H1 to correspond to one side surface of the second bus bar 235 while the plurality of electrode leads 110 are disposed.

Also, the second bus bar 235 may be positioned at the front surface of the second insulating frame 225. Moreover, the second bus bar 235 may be positioned such that the side surface 235c of the second bus bar 235 and an inner side surface of the penetrating portion H2 of the second insulating frame 225 are connected in the front-and-back direction.

Figure 8:
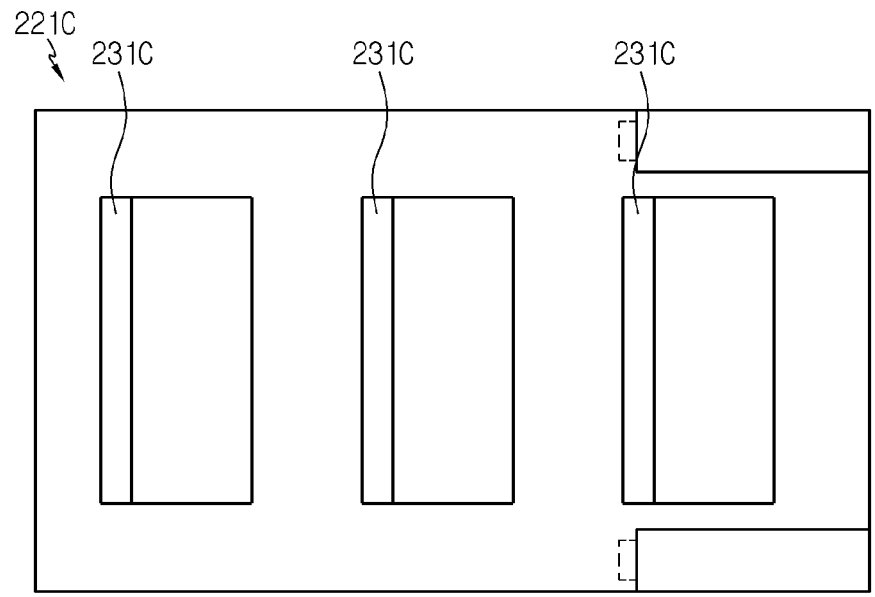
FIG. 8 is a front view schematically illustrating a first bus bar and a first insulating frame, which are isolated partial components with respect to a battery module, according to another embodiment of the present disclosure.
Figure 9:
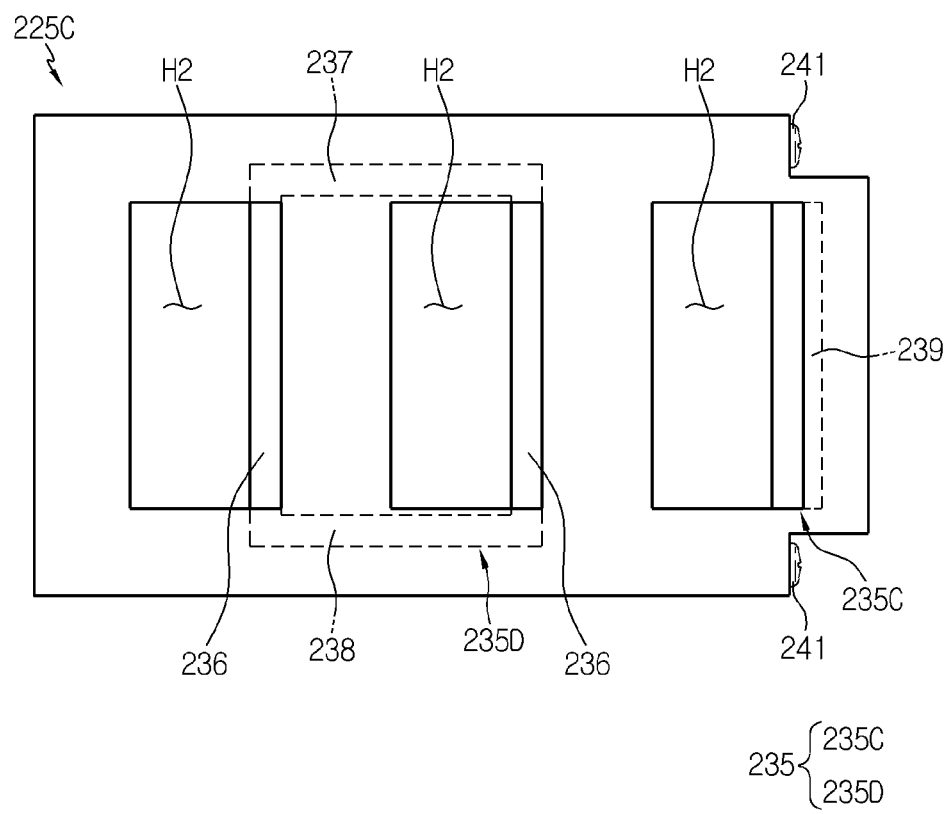
FIG. 9 is a front view schematically illustrating a second bus bar and a second insulating frame, which are isolated partial components with respect to a battery module, according to another embodiment of the present disclosure.
Figure 10:
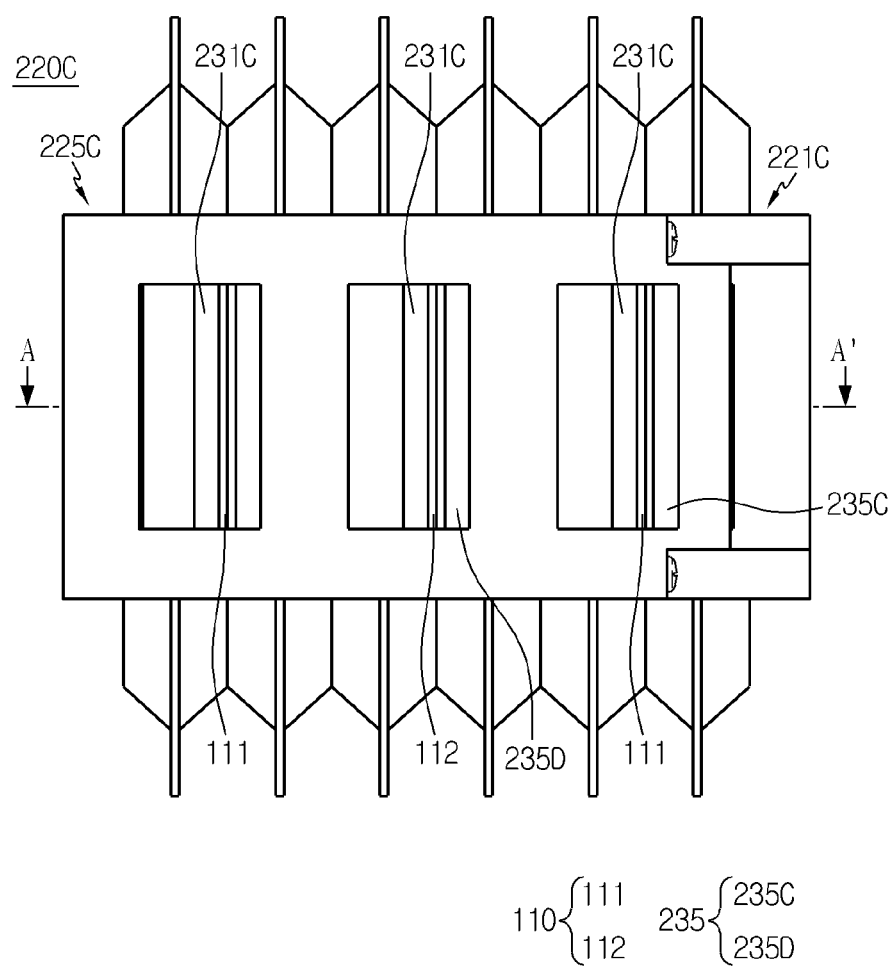
FIG. 10 is a front view schematically illustrating a battery module according to another embodiment of the present disclosure.
Figure 11:
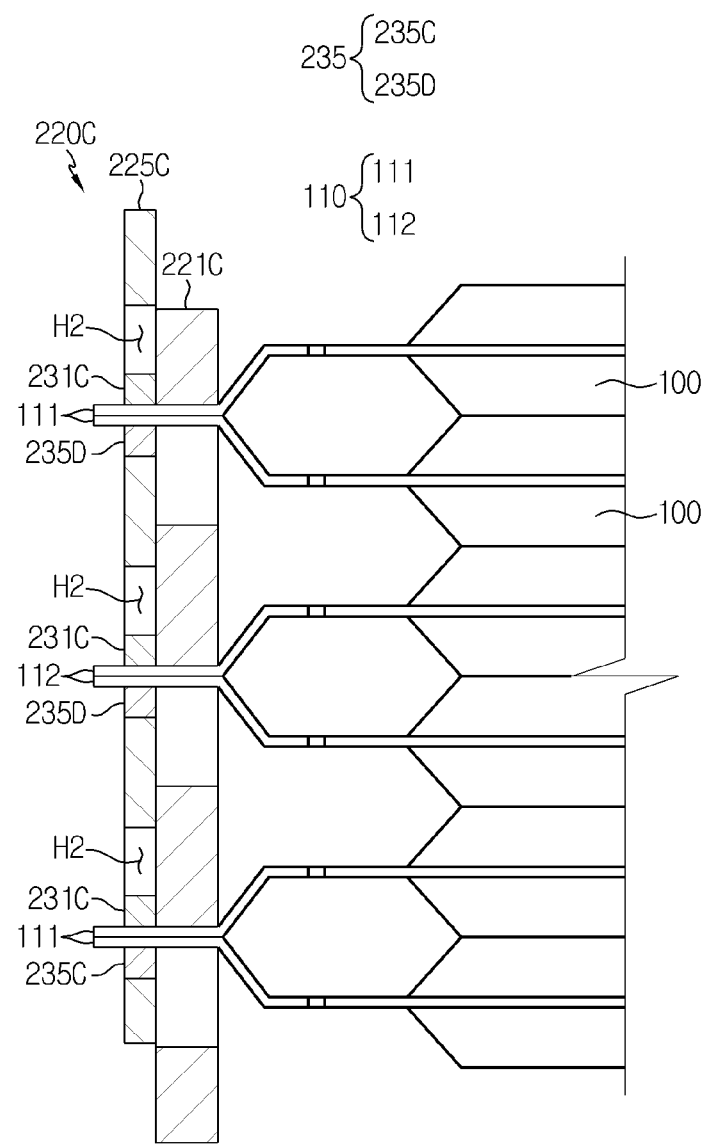
FIG. 11 is a partial cross-sectional view schematically illustrating a cross section of a battery module taken along a line A-A' of FIG. 10.

FIG. 8 is a front view schematically illustrating a first bus bar and a first insulating frame, which are isolated partial components with respect to a battery module, according to another embodiment of the present disclosure. FIG. 9 is a front view schematically illustrating a second bus bar and a second insulating frame, which are isolated partial components with respect to a battery module, according to another embodiment of the present disclosure. FIG. 10 is a front view schematically illustrating a battery module according to another embodiment of the present disclosure. Also, FIG. 11 is a partial cross-sectional view schematically illustrating a cross section of a battery module taken along a line A-A' of FIG. 10.

First, referring to FIG. 8, in a bus bar assembly 220C according to another embodiment of the present disclosure, configurations of a first insulating frame 221C and a first bus bar 231C of FIG. 8 may be the same as a configuration of the first insulating frame 221 of FIG. 6 according to an embodiment of the present disclosure described above. Accordingly, detailed descriptions about the first insulating frame 221C and the first bus bar 231C of FIG. 8 will be omitted.

Meanwhile, referring back to FIGS. 8 through 11, unlike the second bus bar 235 positioned at the front surface of the second insulating frame 225 of FIG. 7, at least a portion of the second bus bar 235 of FIG. 9 may be positioned inside the penetrating portion H2. Also, a side surface of the second bus bar 235 may face at least a portion of a side surface of the first bus bar 231C.

Moreover, a portion of the second bus bar 235 may be inserted into a second insulating frame 225C. Also, an insert injection method may be used as a method for inserting the portion of the second bus bar 235 into the second insulating frame 225C.

For example, a method of manufacturing the second insulating frame 225C into which the second bus bar 235 is inserted may include: (a) preparing the second bus bar 235 of electric conductivity, whose external shape is plasticized via press; (b) mounting and fixing the second bus bar 235 inside a mold; and (c) injecting a melted insulating material into the mold to combine with at least a portion of the second bus bar 235 and performing casting by solidifying the melted material.

As such, according to such a configuration of the present disclosure, by inserting the portion of the second bus bar 235 into the second insulating frame 225, not only the second bus bar 235 second bus bar 235 is stably fixed to the second insulating frame 225C without having to use a separate adhesive member, but also the volume occupied by the second bus bar 235 of FIG. 9 in the front-and-back direction is largely reduced compared with the size of the second insulating frame 225 and second bus bar 235 of FIG. 4 in the front-and-back direction, and thus the size of the bus bar assembly 220C may be ultimately reduced.

Moreover, a portion of the second bus bar 235, which is not inserted into the second insulating frame 225C, may be positioned inside the penetrating portion H2. For example, as shown in FIG. 9, in a second bus bar 235D having the rectangular frame shape, the upper end portion 237 and the lower end portion 238 may be inserted into the second insulating frame 225C, and the both side portions 236 connecting the upper end portion 237 and the lower end portion 238 may be positioned inside the penetrating portion H2 of the second insulating frame 225C.

Also, referring to FIG. 9, in a second bus bar 235C having the bar shape, one side portion 239 may be inserted into the second insulating frame 225C and the other side portion may be externally exposed by being positioned inside the penetrating portion H2.

In other words, the second bus bar 235 of FIG. 9 may be positioned to correspond to the first bus bar 231C positioned at the front surface of the first insulating frame 221C. In other words, the first bus bar 231C may be positioned to correspond to the side surface of the second bus bar 235 as at least a portion is inserted into the penetrating portion H2 of the second insulating frame 225C. Accordingly, the plurality of electrode leads 110 inserted into the insertion portion H1 and the penetrating portion H2 may be disposed on the side surface of the first bus bar 231C and the side surface of the second bus bar 235.

As such, according to such a configuration of the present disclosure, by positioning the portion of the second bus bar 235 inside the penetrating portion H2, the size of a structure of the first bus bar 231C protruding forward to correspond to the one side surface of the second bus bar 235 may be largely reduced, and thus the bus bar assembly 220C may be manufactured with low material costs and a stable structure.

Figure 12:
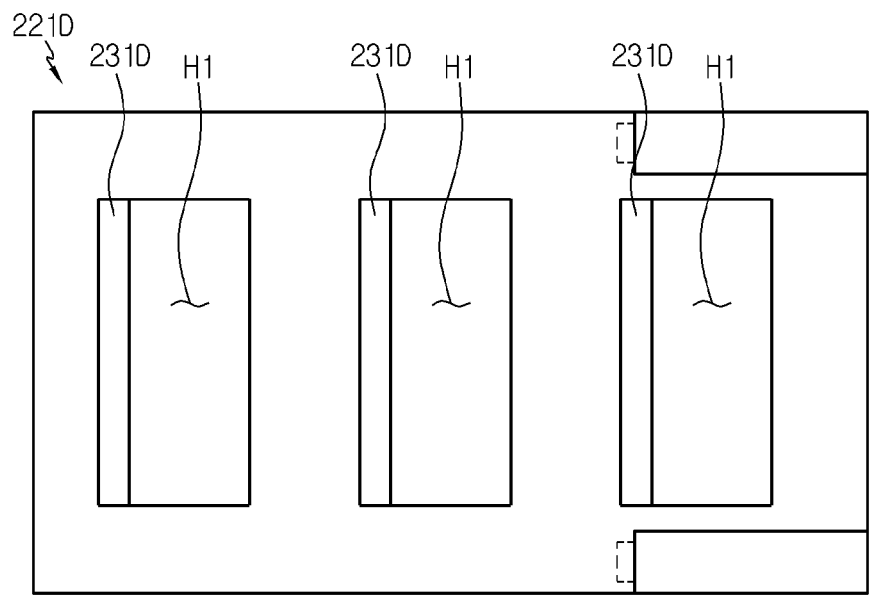
FIG. 12 is a front view schematically illustrating a first bus bar and a first insulating frame, which are isolated partial components with respect to a battery module, according to another embodiment of the present disclosure.
Figure 13:
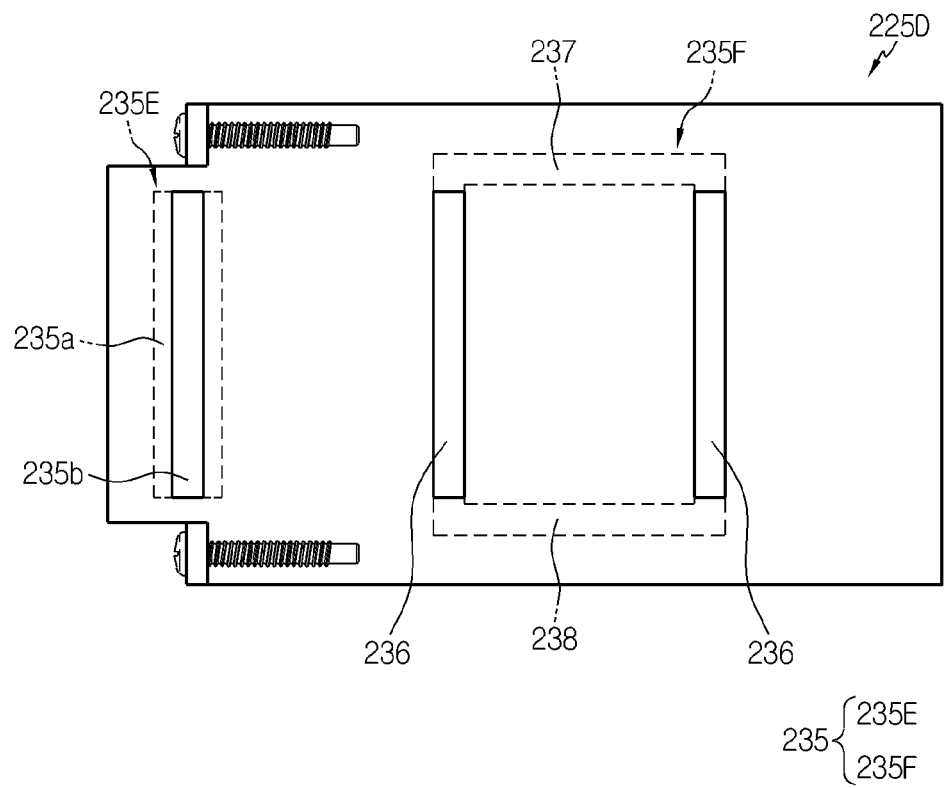
FIG. 13 is a front view schematically illustrating a second bus bar and a second insulating frame, which are isolated partial components with respect to a battery module, according to another embodiment of the present disclosure.
Figure 14:
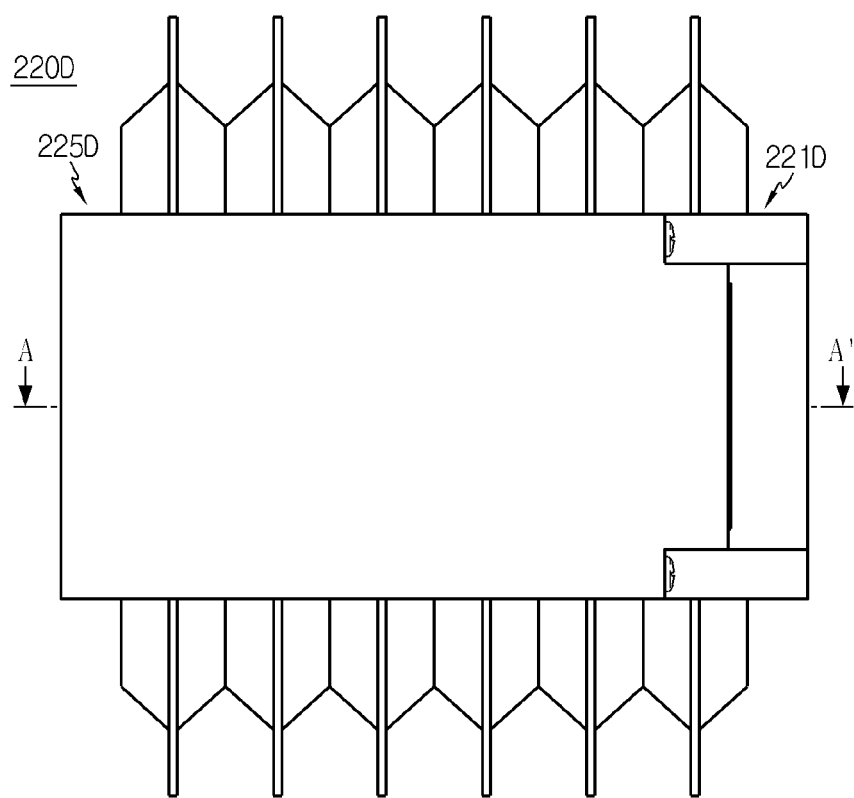
FIG. 14 is a front view schematically illustrating a battery module according to another embodiment of the present disclosure.
Figure 15:
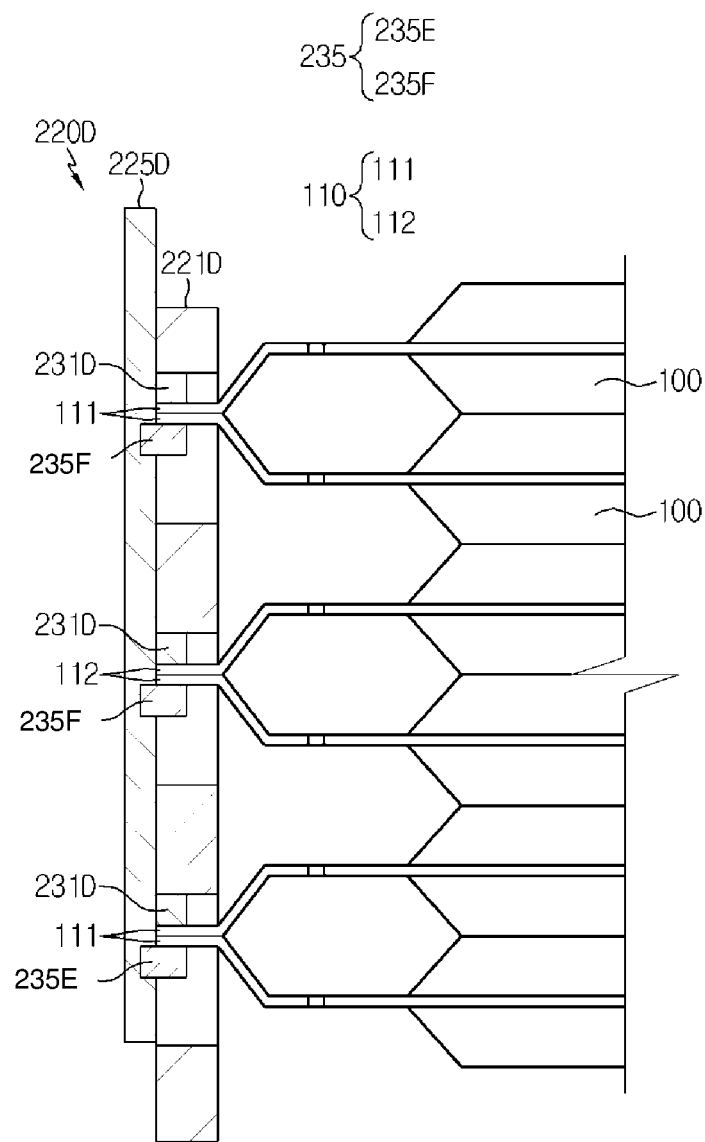
FIG. 15 is a partial cross-sectional view schematically illustrating a cross section of a battery module taken along a line A-A' of FIG. 14.

FIG. 12 is a front view schematically illustrating a first bus bar and a first insulating frame, which are isolated partial components with respect to a battery module, according to another embodiment of the present disclosure. FIG. 13 is a front view schematically illustrating a second bus bar and a second insulating frame, which are isolated partial components with respect to a battery module, according to another embodiment of the present disclosure. FIG. 14 is a front view schematically illustrating a battery module according to another embodiment of the present disclosure. Also, FIG. 15 is a partial cross-sectional view schematically illustrating a cross section of a battery module taken along a line A-A' of FIG. 14.

Referring to FIGS. 12 through 15, a bus bar assembly 220D according to another embodiment of the present disclosure may be configured such that a first bus bar 231D is positioned inside the insertion portion H1 formed in a first insulating frame 221D. In other words, the first bus bar 231D may be positioned inside the insertion portion H1 without protruding forward based on a front surface of the first insulating frame 221D.

As such, according to such a configuration of the present disclosure, by positioning the first bus bar 231D inside the insertion portion H1 formed in the first insulating frame 221D, the volume occupied by the first bus bar 231D of FIG. 12 in the front-and-back direction may be largely reduced compared with the size of the first insulating frame 221 and first bus bar 231 of FIG. 3 in the front-and-back direction, and thus the size of the bus bar assembly 220D may be ultimately reduced.

Moreover, a portion of the first bus bar 231D may be inserted into the first insulating frame 221D such as to be positioned inside the insertion portion H1. Also, an insert injection method may be used as a method of inserting the portion of the first bus bar 231D into the first insulating frame 221D For example, a method of manufacturing the first insulating frame 221D into which the portion of the first bus bar 231D is inserted may include: (a) preparing the first bus bar 231D of electric conductivity, whose external shape is plasticized via press; (b) mounting and fixing the first bus bar 231D inside a mold; and (c) injecting a melted insulating material into the mold to combine with at least a portion of the first bus bar 231D and performing casting by solidifying the melted material.

As such, according to such a configuration of the present disclosure, by inserting the portion of the first bus bar 231D into the first insulating frame 221D, the first bus bar 231D may be fixed to the first insulating frame 221D stably without having to use a separate adhesive material.

Also, at least a portion of the second bus bar 235 of FIG. 13 may protrude backward from a rear surface of a second insulating frame 225D. In other words, at least a portion of the second bus bar 235 may protrude to be inserted into the insertion portion H1 formed in the first insulating frame 221D while the second bus bar 235 is combined to the second insulating frame 225D.

For example, as shown in FIG. 13, in a second bus bar 235F of a quadrangular frame shape, the upper end portion 237 and the lower end portion 238 may be inserted into the second insulating frame 225D, and the both side portions 236 connecting the upper end portion 237 and the lower end portion 238 may protrude backward based on a rear surface of the second insulating frame 225D.

Moreover, in a second bus bar 235E of a bar shape, the front end portion 235a may be inserted into the second insulating frame 225D or a front surface may be adhered to a rear surface of the second insulating frame 225D. Also, the rear end portion 235b of the second bus bar 235E may protrude such that at least a portion is inserted into the insertion portion H1 formed in the first insulating frame 221D.

As such, according to such a configuration of the present disclosure, compared with the second insulating frame 225 of FIG. 4 and the second insulating frame 225C of FIG. 9, the second insulating frame 225D of FIG. 13 does not require a separate penetrating portion for inserting the electrode lead 110, and thus has a simple structure and simplified manufacturing processes.

Moreover, since components, such as the electrode lead 110, the first bus bar 231D, the second bus bar 235, etc., which are internal components of the bus bar assembly 220D, are vulnerable to an external impact, the second insulating frame 225D that does not include the penetrating portion may effectively protect an internal structure of the bus bar assembly 220D from the outside.

Figure 16:
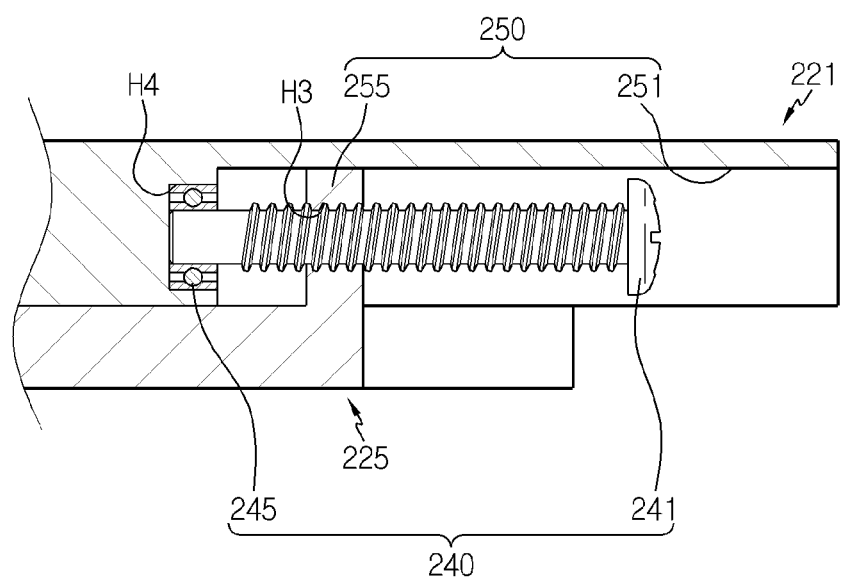
FIG. 16 is a partial cross-sectional view schematically illustrating a cross section of a battery module taken along a line B-B' of FIG. 6.

FIG. 16 is a partial cross-sectional view schematically illustrating a cross section of a battery module taken along a line B-B' of FIG. 6.

Referring to FIG. 16 together with FIG. 6, the bus bar assembly 220 may include a locking member 240 configured such that the first insulating frame 221 and the second insulating frame 225 are locked and fixed to each other.

Here, the locking member 240 may be configured to such that the first insulating frame 221 and the second insulating frame 225 are locked and fixed to each other while the first insulating frame 221 and the second insulating frame 225 slide in the left-and-right direction indicated by arrows E to cross each other.

In other words, when the first and second insulating frames 221 and 225 slide in the left-and-right direction to cross each other, the locking member 240 may lock and fix the first insulating frame 221 and the second insulating frame 225 while the plurality of electrode leads 110 inserted into the insertion portion H1 or into the insertion portion H1 and the penetrating portion H2 are disposed between the first bus bar 231 and the second bus bar 235.

In particular, the second bus bar 235 may pressurize one side of the plurality of electrode leads 110 while moving in direction where the first bus bar 231 is positioned, and the other side of the pressurized plurality of electrode leads 110 may contact a side surface of the first bus bar 231. As a result, both sides of the plurality of electrode leads 110 inserted into the insertion portion H1 or into the insertion portion H1 and the penetrating portion H2 may be pressurized and fixed by the first bus bar 231 and the second bus bar 235.

In particular, the locking member 240 may include a locking bolt 241.

Here, the locking bolt 241 may include a head and a round rod extending in one direction from the head. A thread may be formed on the round rod.

Also, as shown in FIG. 3, the first insulating frame 221 may include an insertion groove G configured such that at least a portion of the round rod of the locking bolt 241 is inserted. For example, the insertion groove G may be formed on a side surface portion contacting an outer circumference of the first insulating frame 221. Also, the insertion groove G may be formed on the front surface of the first insulating frame 221.

Moreover, the second insulating frame 225 may include a penetrating hole H3 through which the round rod of the locking bolt 241 passes. For example, the penetrating hole H3 may be formed on a side end portion contacting an outer circumference of the second insulating frame 225. Alternatively, the penetrating hole H3 may be formed on a rear surface of the second insulating frame 225.

Then, the locking bolt 241 may sequentially penetrate the penetrating hole H3 of the second insulating frame 225 and be inserted and fixed to the insertion groove G of the first insulating frame 221.

For example, as shown in FIG. 3, the insertion groove G may be formed on the front surface of each of the upper end portion and the lower end portion of the first insulating frame 221. Also, as shown in FIG. 5, the penetrating hole H3 may be formed on the rear surface of the second insulating frame 225. Also, as shown in FIG. 6, the two locking bolts 241 may each sequentially penetrate the penetrating hole H3 of the second insulating frame 225 and be inserted and fixed to the insertion groove G of the first insulating frame 221.

As such, according to such a configuration of the present disclosure, in the locking member 240, by inserting and fixing the locking bolt 241 to the insertion groove G formed in the first insulating frame 221 and the penetrating hole H3 formed in the second insulating frame 225, the first insulating frame 221 and the second insulating frame 225 may be efficiently and stably combined and fixed to each other.

The locking member 240 may further include a nut or a bearing 245 inserted and fixed to the insertion groove G. In other words, the bearing 245 may be configured such that the locking bolt 241 is inserted and locked.

As such, according to such a configuration of the present disclosure, by locking the locking bolt 241 to the bearing 245 including a solid metal material inserted and fixed into the insertion groove G, further stable fixation may be achieved than when the locking bolt 241 is inserted and fixed to the insertion groove G.

Referring back to FIG. 16 together with FIG. 6, a moving guide portion 250 configured to guide the first insulating frame 221 and the second insulating frame 225 to slide in the left-and-right direction to cross each other may be formed in the first insulating frame 221 and the second insulating frame 225.

In particular, the moving guide portion 250 may include a guide groove 251 and a guide protrusion 255.

Here, the guide groove 251 may be recessed backward from the front surface of the first insulating frame 221. In other words, the guide groove 251 may be a groove having one portion among a front surface recessed backward than the remaining portions. For example, as shown in FIG. 3, the two guide grooves 251 may be formed on a front surface of each of an upper end portion and a lower end portion of the first insulating frame 221.

Also, the guide groove 251 may extend in the left-and-right direction so as to guide the second insulating frame 225 to slide in the left-and-right direction. Further, the insertion groove G may be formed on a side wall of an end portion where the guide groove 251 is ended.

In other words, by sliding the second insulating frame 225 in the left-and-right direction along the guide groove 251 and then enabling the locking bolt 241 to sequentially penetrate the penetrating hole H3 of the second insulating frame 225 and be inserted and fixed to an insertion groove of the first insulating frame 221, the first insulating frame 221 and the second insulating frame 225 may be locked and fixed to each other while the plurality of electrode leads 110 are interposed between the first bus bar 231 and the second bus bar 235.

Referring to FIGS. 5 and 16, the guide protrusion 255 may be formed to protrude backward from the rear surface of the second insulating frame 225. Also, the guide protrusion 255 may be formed to correspond to the guide groove 251 formed on the front surface of the first insulating frame 221. For example, when the guide groove 251 is formed to have a rounded inner surface on a vertical cross section, an outer surface of the guide protrusion 255 may have a round protruding shape. When the guide groove 251 is formed to have an inner surface angulated on the vertical cross section, the outer surface of the guide protrusion 255 may have an angulated protrusion shape.

Moreover, the guide protrusion 255 may be accommodated on an inner surface of the guide groove 251 and move in the left-and-right direction. In other words, the guide protrusion 255 may be formed to move in the left-and-right direction by being accommodated on the inner surface of the guide groove 251 extending in the left-and-right direction. For example, as shown in FIG. 5, the two guide protrusions 255 may be formed on a rear surface of each of the upper end portion and the lower end portion of the second insulating frame 225.

As such, according to such a configuration of the present disclosure, the moving guide portion 250 enables the second insulating frame 225 to easily slide on the first insulating frame 221 by using configurations of the guide groove 251 and the guide protrusion 255, thereby not only facilitating position setting for locking the first insulating frame 221 and the second insulating frame 225, but also facilitating a work of disposing the plurality of electrode leads 110 between the first bus bar 231 and the second bus bar 235.

Figure 17:
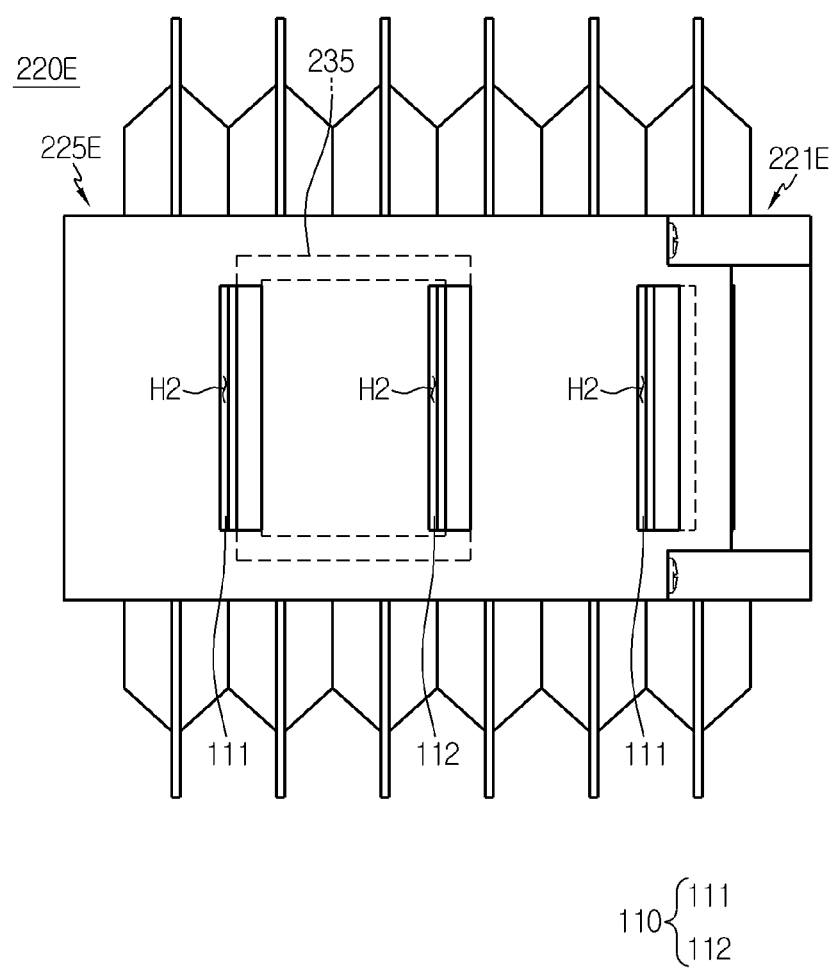
FIG. 17 is a front view schematically illustrating a battery module according to another embodiment of the present disclosure.

FIG. 17 is a front view schematically illustrating a battery module according to another embodiment of the present disclosure.

Referring to FIG. 17, another bus bar assembly 220E of the present disclosure may include only a part of the plurality of first bus bars 231 and plurality of second bus bars 235, unlike the bus bar assembly 220 of an embodiment described above. For example, all of first bus bars of a first insulating frame 221E and a second bus bar of a bar shape of a second insulating frame 225E may not be provided.

In this case, while the first insulating frame 221E and the second insulating frame 225E slide in the left-and-right direction to cross each other, the plurality of electrode leads 110 inserted into an insertion portion (not shown) of the first insulating frame 221E and the penetrating portion H2 of the first insulating frame 221E may overlap each other between the first insulating frame 221E and the second insulating frame 225E.

In other words, in the bus bar assembly 220E of FIG. 17, the plurality of electrode leads 110 overlap each other between the first insulating frame 221E and the second insulating frame 225E even when some bus bars are omitted, and thus electric connection between the plurality of electrode leads 110 may be achieved.

As such, according to such a configuration of the present disclosure, the applied numbers of first and second bus bars 231 and 235 may be effectively reduced compared with the bus bar assembly 220 of an embodiment described above, and thus material costs may be reduced, thereby effectively reducing unit cost.

Also, a battery pack (not shown) according to the present disclosure may include at least two battery modules 200. In particular, the at least two battery modules 200 may be aligned in one direction. In some cases, the battery pack may further include a heat sink (not shown) for heat dissipation.

Also, an electronic device (not shown) according to the present disclosure may include the battery pack. For example, the battery pack may be accommodated inside an outer case of the electronic device. Also, the electronic device may be a type of transportation, such as an electric bicycle, or a machine tool.

Meanwhile, in the present specification, the terms indicating directions, such as up, down, left, right, front, and back, are used but it would be obvious to one of ordinary skill in the art that the terms are used only for convenience of description and may vary according to a position of a target object, a position of an observer, or the like.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

REFERENCE SIGNS

200: battery module
210: cell assembly
100: secondary battery
110: electrode lead
220: bus bar assembly
221: first insulating frame
H1: insertion portion
G: insertion groove
225: second insulating frame
H2: penetrating portion
H3: penetrating hole
231: first bus bar
235: second bus bar
240: locking member
241: locking bolt
245: bearing
250: moving guide unit
251: guide groove
255: guide protrusion

INDUSTRIAL APPLICABILITY

The present disclosure relates to a battery module including a bus bar assembly. Also, the present disclosure is applicable to industries related to a battery pack including a plurality of battery modules and an electric part, an electronic device including the battery pack, an energy storage system, or a vehicle.

What is claimed is:

1. A battery module comprising:
a cell assembly comprising a plurality of secondary batteries having a plurality of electrode leads, respectively, formed in a shape protruding in a front-and-back direction and stacked on each other in a left-and-right direction; and
a bus bar assembly configured to provide electric connection between the plurality of secondary batteries,
wherein the bus bar assembly comprises:
a first insulating frame where one or more insertion portions perforated from a back surface to a front surface are formed such that at least one of the plurality of electrode leads is inserted in each of the one or more insertion portions, and comprising an electrically insulating material;
a second insulating frame mounted on the front surface of the first insulating frame and comprising an electrically insulating material;
a first bus bar mounted on the first insulating frame, contacting one of the plurality of electrode leads inserted into each of the one or more insertion portions, the one of the plurality of electrode leads being located at a first end of the plurality of electrode leads, and comprising an electrically conductive material; and a second bus bar mounted on the second insulating frame, contacting one of the plurality of electrode leads inserted into each of the one or more insertion portions located at a second end opposite the first end, and comprising an electrically conductive material.

2. The battery module of claim 1, wherein the first bus bar and the second bus bar respectively comprise front surfaces, rear surfaces, and side surfaces based on the front-and-back direction, wherein the side surfaces of each of the first bus bar and the second bus bar contact a left side surface or right side surface of one of the plurality of electrode leads, and at least portions of the side surfaces of the first bus bar and the second bus bar are positioned to face each other while the plurality of electrode leads are disposed to closely contact each other.

3. The battery module of claim 2, wherein the first bus bar and the second bus bar each have a bar shape extending in an up-and-down direction or a quadrangular frame shape with a hollow center.

4. The battery module of claim 3, wherein the second insulating frame comprises a penetrating portion penetrated from a rear surface to a front surface such that at least one of the plurality of electrode leads is inserted in the penetrating portion, and the first bus bar is positioned on the front surface of the first insulating frame and has at least a portion protruding forward and inserted into the penetrating portion.

5. The battery module of claim 4, wherein the first bus bar is configured to protrude forward past a front surface of the second insulating frame, and the second bus bar is positioned on the front surface of the second insulating frame.

6. The battery module of claim 4, wherein the second bus bar is positioned at an inner side of the penetrating portion such that one of the side surfaces of the second bus bar faces a portion of one of the side surfaces of the first bus bar.

7. The battery module of claim 3, wherein the first bus bar is configured to be positioned at an inner side of an insertion portion formed in the first insulating frame, and at least a portion of the second bus bar protrudes backward from a rear surface of the second insulating frame and is inserted into the insertion portion of the first insulating frame.

8. The battery module of claim 1, wherein the bus bar assembly further comprises a locking member configured to lock and fix the first insulating frame and the second insulating frame to each other.

9. The battery module of claim 8, wherein the locking member comprises a locking bolt, the first insulating frame comprises an insertion groove configured such that at least a portion of a round rod of the locking bolt is inserted, the second insulating frame comprises a penetrating hole configured such that the round rod of the locking bolt is penetrated, and the locking bolt sequentially penetrates the penetrating hole of the second insulating frame and is inserted into and fixed to the insertion groove of the first insulating frame.

10. The battery module of claim 9, wherein the locking member further comprises a nut or a bearing inserted into and fixed to the insertion groove and configured to lock the locking bolt inserted therein.

11. The battery module of claim 8, wherein each of the first insulating frame and the second insulating frame comprises a moving guide portion configured to guide the first insulating frame and the second insulating frame to slide in the left-and-right direction to cross each other.

12. The battery module of claim 11, wherein the moving guide portion comprises:

a guide groove recessed backward from each of a top portion and a bottom portion of the front surface of the first insulating frame and extending in the left-and-right direction; and a guide protrusion protruding backward from each of a top portion and a bottom portion of a rear surface of the second insulating frame and accommodated on an inner surface of the guide groove to move in the left-and-right direction.

13. A battery pack comprising at least one battery module according to claim 1.

14. A device comprising the battery pack of claim 13.

15. A battery module comprising:

a cell assembly comprising a plurality of secondary batteries having a plurality of electrode leads, respectively, formed in a shape protruding in a front-and-back direction and stacked on each other in a left-and-right direction; and a bus bar assembly configured to provide electric connection between the plurality of secondary batteries, wherein the bus bar assembly comprises:

a first insulating frame where one or more insertion portions perforated from a back surface to a front surface are formed such that at least one of the plurality of electrode leads is inserted in each of the one or more insertion portions while being adhered to each other and comprising an electrically insulating material;

a second insulating frame mounted on the front surface of the first insulating frame, where one or more penetrating portions perforated from a rear surface to a front surface are formed such that at least one of the plurality of electrode leads is inserted in each of the one or more penetrating portions while being adhered to each other, and comprising an electrically insulating material;

a first bus bar mounted on the first insulating frame, contacting one of the plurality of electrode leads inserted into each of the one or more insertion portions, the one of the plurality of electrode leads being located at a first end of the plurality of electrode leads, and comprising an electrically conductive material; and a second bus bar mounted on the second insulating frame, contacting one of the plurality of electrode leads inserted into each of the one or more insertion portions located at a second end opposite the first end, and comprising an electrically conductive material, wherein the plurality of electrode leads overlap each other between the first insulating frame and the second insulating frame while the first insulating frame and the second insulating frame slide in the left-and-right direction to cross each other.

* * * * *